BEST AVAILABLE COPY

T911,012

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 26, 1973

911 O.G. 1136

T911,012

SPRAYABLE, SAG-RESISTANT METHACRYLATE SYRUP AND PROCESS FOR PREPARING A FINAL GEL COAT THEREFROM

Ronald Newell Liesemer, Wilmington, Del., assignor to E. I. du Pont de Nemours and Company, Wilmington, Del.

Continuation of abandoned application Ser. No. 811,255, Mar. 27, 1969. This application July 21, 1971, Ser. No. 164,899

Int. Cl. C08f *15/16, 45/52*

U.S. Cl. 260—28.5 R

No Drawing. 20 Pages Specification

A sprayable, sag-resistant methacrylate syrup containing a monomer liquid containing methyl methacrylate, a polymer containing methyl methacrylate polymerized units, a thixotropic agent, pigment and paraffin wax; and a process for preparing a final gel coat therefrom by mixing said syrup with an initiator system, curing for up to 3 hours at ambient conditions; and postcuring at 95° C. to 140° C. for from 30 minutes to 16 hours.